United States Patent
Sundaram et al.

(10) Patent No.: US 9,778,723 B2
(45) Date of Patent: Oct. 3, 2017

(54) APPARATUSES AND METHODS FOR EXITING LOW POWER STATES IN MEMORY DEVICES

(71) Applicant: MICRON TECHNOLOGY, INC., Boise, ID (US)

(72) Inventors: Rajesh Sundaram, Folsom, CA (US); William Low, Vancouver (CA); Sowmiya Jayachandran, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/980,592

(22) Filed: Dec. 28, 2015

(65) Prior Publication Data
US 2017/0185136 A1    Jun. 29, 2017

(51) Int. Cl.
*G06F 1/32*        (2006.01)
*G06F 13/42*       (2006.01)

(52) U.S. Cl.
CPC .......... *G06F 1/3206* (2013.01); *G06F 1/3275* (2013.01); *G06F 1/3287* (2013.01); *G06F 13/4234* (2013.01)

(58) Field of Classification Search
CPC .... G06F 1/3206; G06F 1/3275; G06F 1/3287; G06F 13/4243
See application file for complete search history.

(56) References Cited

U.S. PATENT DOCUMENTS

| | | | | |
|---|---|---|---|---|
| 5,818,350 A | * | 10/1998 | Estakhri | G11C 8/12 340/9.16 |
| 6,618,791 B1 | * | 9/2003 | Dodd | G06F 1/3225 711/105 |
| 2008/0155287 A1 | * | 6/2008 | Sundaram | G11C 16/30 713/322 |
| 2008/0215903 A1 | | 9/2008 | Payne | |
| 2014/0181555 A1 | | 6/2014 | Bodas et al. | |
| 2014/0322956 A1 | * | 10/2014 | Naito | H01R 13/6582 439/370 |
| 2014/0337645 A1 | | 11/2014 | Ware et al. | |
| 2016/0350002 A1 | * | 12/2016 | Vergis | G06F 3/0605 |

OTHER PUBLICATIONS

Receipt of ISR/WO dated Apr. 3, 2017 for appln No. PCT/US2016/066383.

* cited by examiner

*Primary Examiner* — Stefan Stoynov
(74) *Attorney, Agent, or Firm* — Dorsey & Whitney LLP (57) ABSTRACT

According to one embodiment, an apparatus is disclosed. The apparatus includes a memory device having a device identification, The apparatus further includes a low power wake circuit configured to receive a low power wake signal and an identification information, and further configured to initiate a transition of the memory device from a low power state to an active state responsive to an active low power wake signal and the wake identification information matching the device identifier.

19 Claims, 6 Drawing Sheets

APPARATUSES AND METHODS FOR EXITING LOW POWER STATES IN MEMORY DEVICES

BACKGROUND

Many memory devices include a low power state that the device may enter in order to reduce the total power consumption of the memory system. To exit the low power state, or "wake up" the memory device, many traditional systems toggle a clock enable (CKE) signal, which is provided to and interpreted by the memory device as a command to wake up. However, the CKE signal serves another purpose, which is to control the clock signal access with respect to memory devices. That is, the CKE signal controls whether a particular memory device can receive the clock signal to perform memory operations. Additionally, many systems include multiple memory devices that share a CKE signal. Therefore, one memory device may require a particular CKE signal to perform operations, but the CKE signal may be toggled to wake up another memory device. The act of toggling the CKE signal to wake up the memory device can interfere with the operations of any other memory device that is concurrently using the CKE signal.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
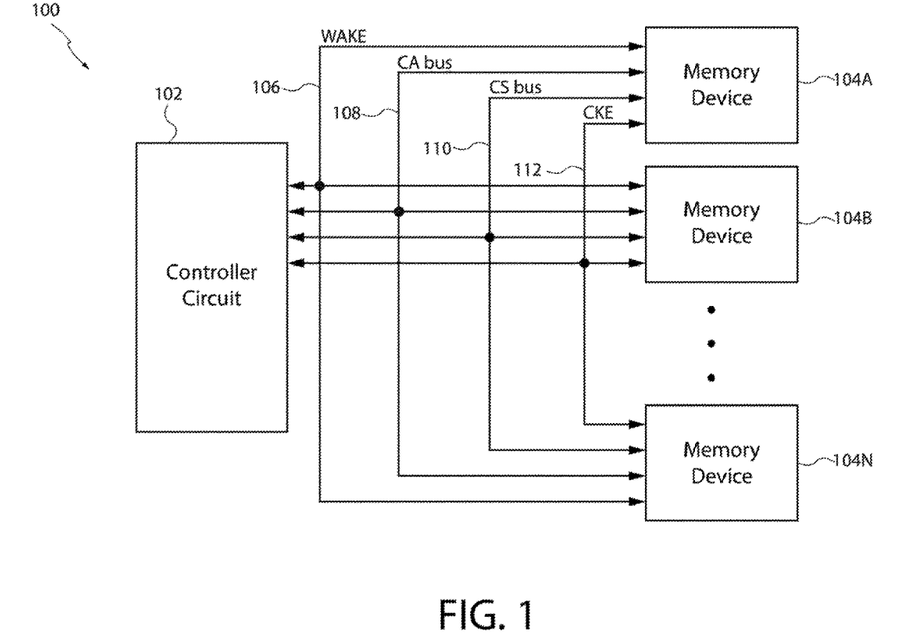
FIG. 1 is a functional block diagram of a memory system, in accordance with an embodiment of the present invention.

Many traditional memory systems include at least one active state and at least one low power state. In such systems, to exit the low power state, or "wake up" a memory device into an active state, a controller circuit toggles a shared clock enable (CKE) signal, which the low power memory device interprets as a wake up command. One drawback to traditional system is that the CKE signal also controls a clock signal that may be contemporaneously in use by another memory device. Therefore, toggling the shared CKE signal may interfere with the dock signal that is being used by another memory device, leading to errors, added latency, or other problems with the operation of the memory system. This disclosure is directed to methods, systems, and interfaces that decouple the CKE signal from the low power state exit operation by providing a shared WAKE bus and device identification (ID) system to wake up low power memory devices without interrupting the CKE signal. Additionally, embodiments described herein provide systems for exiting low power states without toggling the CKE signal and without substantially increasing the number of connections and pins required. For example, some embodiments described herein add a single connection to traditional memory systems Turning now to the Figures, FIG. 1 is a functional block diagram of a memory system, generally designated 100, in accordance with an embodiment of the present invention. The memory system 100 generally includes a memory controller circuit 102, and a plurality of memory devices 104A, 104B . . . 104N (collectively referred to herein as memory devices 104). The memory controller circuit 102 and the memory devices 104 are commonly coupled by a number of buses. In the embodiment of FIG. 1, each of the memory devices 104 is coupled to the memory controller circuit 102 via a common WAKE bus 106, a common command/address (CA) bus 108, a common chip select (CS) bus 110, and a common CKE bus 112.

The memory controller circuit 102 includes one or more components configured to manage the operation of the memory devices 104 within the memory system 100. Among other things, the memory controller circuit 102 is configured to manage the power states of the memory devices 104. For example, the memory controller circuit 102 can provide commands in the form of signals to one or more of the memory devices 104 to enter a low power state when those memory devices 104 are not in use. Similarly, the memory controller circuit 102 wakes up the memory devices 104 when access to them is needed, such as to perform read and/or write operations. By effectively and efficiently managing the power states of the memory devices 104, the overall power consumed by the memory system 100 may be reduced. As described in further detail below, the memory controller circuit 102 can selectively wake up one or more of the memory devices 104 using the signals provided to the memory devices 104 via the WAKE bus 106, the CA bus 108, and the CS bus 110.

The memory devices 104 can be any type of memory or storage medium having at least one active state and at least one low power state. When one or more of the memory devices 104 is not in use, the idle memory devices 104 can enter a low power state to reduce the overall power consumption of the memory system 100. When a memory device 104 is required to perform some operation, the memory controller circuit 102 can initiate a low power state exit operation, which places the memory device 104 in an active state. Each memory device 104 is commonly coupled to the memory controller circuit 102 via the WAKE bus 106, the CA bus 108, the CS bus 110, and the CKE bus 112.

In various embodiments, the memory devices 104 can be woken up based on received signals on the WAKE bus 106, the CA bus 108, and the CS bus 110 without interrupting usage of the CKE bus by any other memory device. Each of the memory devices 104 has an associated device identification (Device ID). In various embodiments, each memory device 104 may have a unique Device ID. In other embodiments, two or more memory devices 104 may have a common Device ID. The Device IDs may be assigned to memory devices 104, for example, upon powering up the devices. That is, when the memory system 100 is powered up, the memory controller 102 assigns a Device ID to each of the memory devices 104 (e.g., Device IDs 1-N). The memory devices 104 can store the assigned Device IDs locally for reference during a low power state exit operation.

The WAKE bus 106, CA bus 108, the CS bus 110, and the CKE bus 112 are electrical connections and interfaces between the memory controller circuit 102 and the memory devices 104. In various embodiments, the memory controller circuit 102 can transmit a signal that is conveyed by the WAKE bus 106 to the memory devices 104 to indicate that at least one memory device 104 is to exit a low power state and enter an active state. The CA bus 108 is the command and address bus, which enables the controller to provide command and address information to the memory devices 104 to perform memory operations. The CA bus 108 conveys the command and address information to the memory devices 104. In various embodiments, the CA bus 108 can be a multi-bit bus. For example, the CA bus 108 can be a parallel or serial connection. The memory controller circuit 102 can provide identification information to the memory devices 104 as part of a low power state exit operation. The identification information may be provided as wake identification information (a "Wake ID") provided via a signal (a "Wake ID signal") conveyed by the CA bus 108 to the memory devices 104 as part of a low power state exit operation. The CS bus 110 can convey a chip select signal and enable the memory devices 104 to receive and process signals conveyed by the CA bus 108. For example, the memory controller circuit 102 can transmit an enable signal, which is conveyed by the CS bus to the memory devices 104. In response, the memory devices 104 can receive and process signals conveyed by the CA bus 108 while the CS bus 110 is conveying the enable signal. As described in further detail below, the memory controller circuit 102 can transmit the Wake ID signal to be conveyed on the CA bus 108 while also transmitting the enable signal to be conveyed on the CS bus 110, which enables the memory devices 104 to receive and process the Wake ID signal. The CKE signal operates as described above, conveying a clock enable signal that allows the memory devices 104 to receive and use a clock signal to perform memory operations. As described in further detail below, the WAKE bus 106, the CA bus 108, and the CS bus 110 convey signals that enable the memory controller circuit 102 to initiate a low power state exit in one or more memory devices 104 without interrupting any signal that is concurrently being conveyed by the CKE bus 112. The WAKE bus 106, CA bus 108, and/or the CS bus 110, or a combination thereof, may provide an interface for initiating a low power state exit operation in one or more of the memory devices 104.

Figure 2:
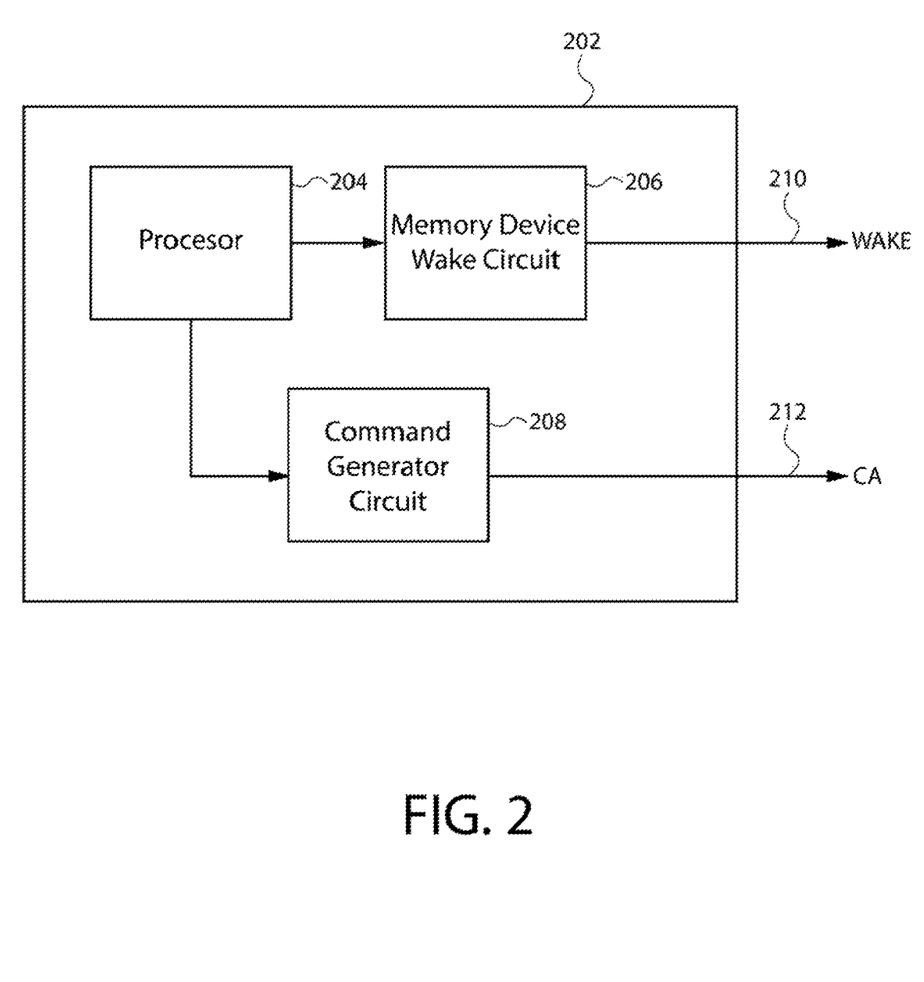
FIG. 2 is a functional block diagram of a memory controller circuit, in accordance with an embodiment of the present invention.

FIG. 2 is a functional block diagram of a memory controller circuit 202, in accordance with an embodiment of the present invention. The memory controller circuit 202 includes a processor 204, a memory device wake circuit 206, and a command generator circuit 208. The processor 204 may be configured to receive memory commands, such as read and write commands from a host device, such as a computer. The processor may be further configured to determine one or more memory devices to access to complete the received memory commands. In some embodiments, completion of a memory command includes waking up a memory device, e.g., memory device 104A, from a low power state to an active state. The processor 204 may provide an instruction to the command generator circuit 208 to provide one or more Wake ID signals on the CA bus 212. The Wake ID signals may be used to identify one or more memory devices 104 in which to initiate low power state exit operations, as described in further detail below with respect to FIG. 4. The processor 204 may further be configured to instruct the memory device wake circuit to provide a Wake signal on the WAKE bus 210. The memory device wake circuit 206 may be configured to receive the instruction from the processor 204 and generate a Wake signal on the WAKE bus 210. As described in further detail below, one or more memory devices 104 may be coupled to the WAKE bus 210 and the CA bus 212, and configured to remain in a low power state or exit the low power state based on the Wake ID signal and the Device ID.

Figure 3:
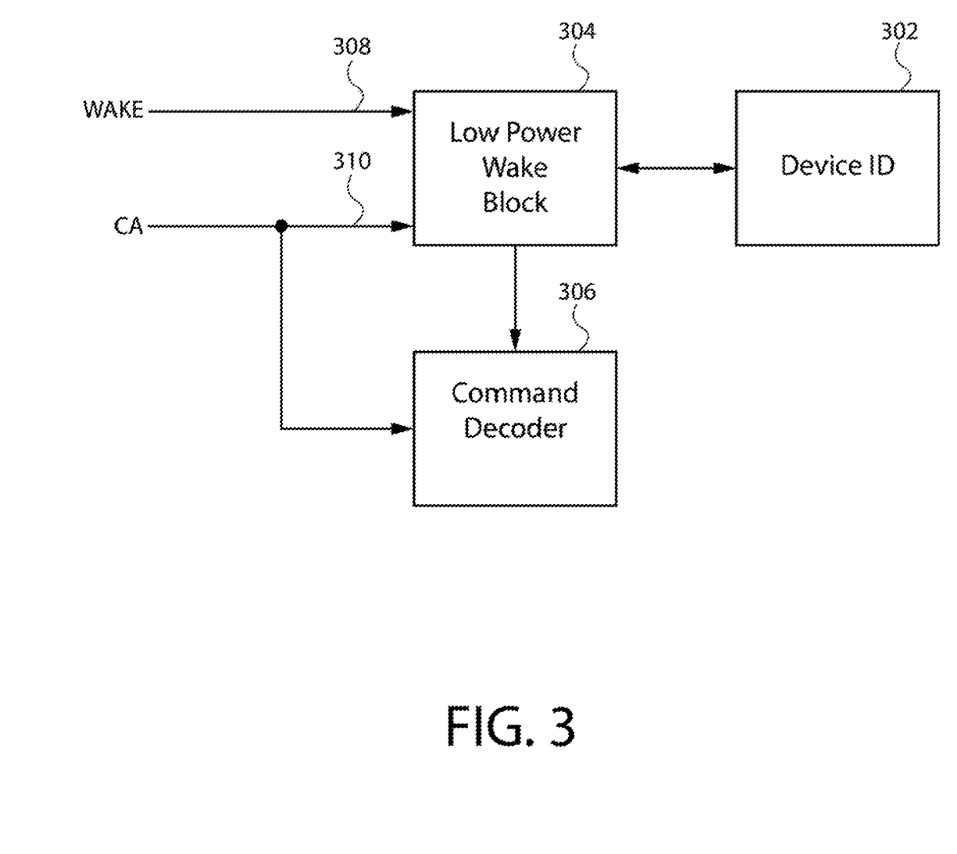
FIG. 3 is a functional block diagram of a memory device, in accordance with an embodiment of the present invention.

FIG. 3 is a functional block diagram of a portion of a memory device, in accordance with an embodiment of the present invention. In various embodiments, the portion of the memory device shown in FIG. 3 may be implemented as a portion of the memory devices 104 of FIG. 1. The memory device may have at least one active state and at least one low power state to reduce power consumption. Generally, a low power state can be any state that a memory device can be placed in that reduces its power consumption but does not cause loss of stored data in the memory device. For example, a memory device may remove power from certain circuits or subsystems, such as some device control logic, charge pumps, etc., in the memory device when the device is in a low power state. The portion of the memory device includes a Device ID circuit 302, a low power wake circuit 304 and a command decoder 306. The Device ID circuit 302 can be any circuit configured to store a Device ID for the memory device. The low power wake circuit 304 is configured to receive a Wake signal through a WAKE bus 308 and a Wake ID signal through CA bus 310. Responsive to detecting the Wake signal (e.g., a rising edge of a signal), the low power wake circuit 304 may be further configured to compare the Wake signal provided through the CA bus 310 with the Device ID stored in the Device ID circuit 302 of the memory device. Responsive to determining that the Wake ID signal matches the Device ID, the low power wake circuit 304 may be further configured to signal the command decoder 306 to initiate a low power state exit operation for the memory device. The low power state exit operation may transition the memory device from a low power state to an active state, enabling the memory device to perform memory operations, such as read and write operations.

Figure 4:
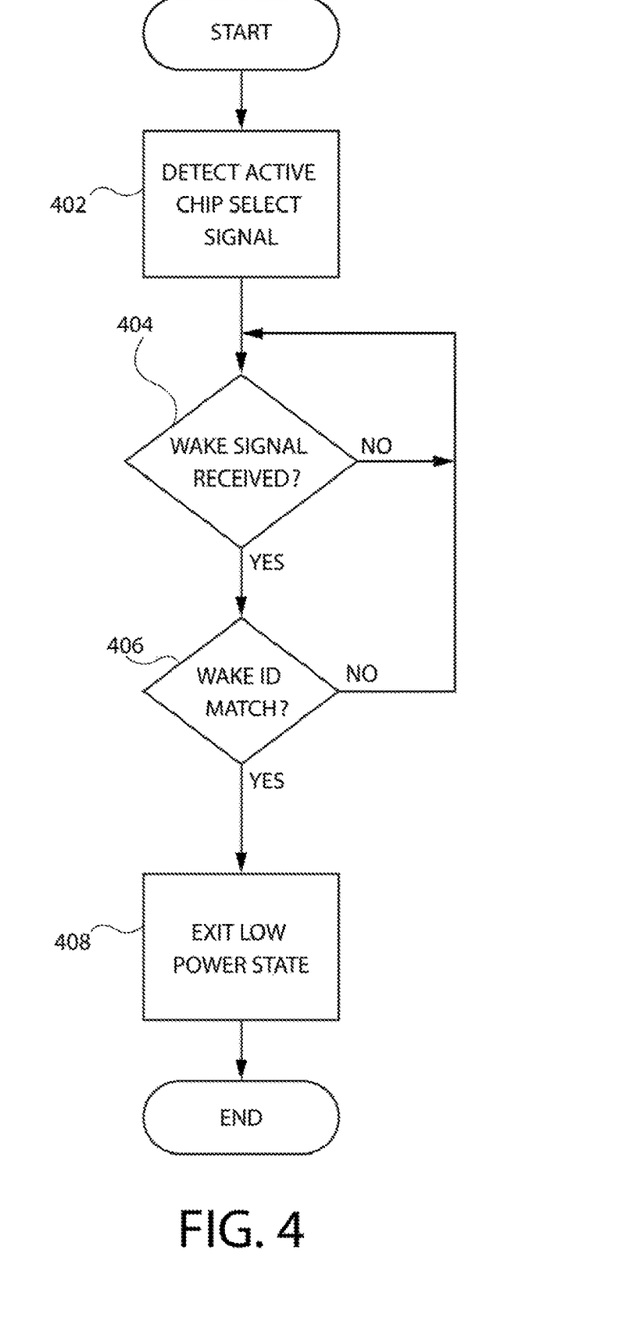
FIG. 4 is a flowchart illustrating a method of exiting a low power state for a memory device, in accordance with an embodiment of the present invention.

FIG. 4 is a flowchart illustrating a method 400 of exiting a low power state for a memory device (e.g., memory device 104A), in accordance with an embodiment of the present invention. In operation 402, the memory device 104A detects an active chip select signal (e.g., active low) via the CS bus 110. Based on the active chip select signal, the memory device 104A can process signals provided to the memory device on the CA bus 108. As discussed above, the chip select signal received by the memory device 104A controls whether the memory device 104A can receive and process signals via the CA bus 108. For example, the memory device 104A may only receive information via the CA bus 108 if the CS bus 110 holds a logic low signal. Alternatively, if the CA bus 110 provides a chip select signal that is logic high, the memory device 104A does not receive information via the CA bus 108.

In decision block 404, the memory device 104A determines whether an active WAKE signal was detected. In various embodiments, the memory device 104A can detect an active WAKE signal (e.g., active high) on the WAKE bus 106. As discussed above, the memory controller 102 can initiate a low power state exit operation by transmitting an active WAKE signal on the WAKE bus 106. The memory devices 104 can include a circuit, or a combination of circuits configured to detect an active WAKE signal. If the memory device 104A determines that an active wake signal was not received (decision block 404, NO branch), then the memory device 104A continues to monitor the WAKE bus 106 for an active WAKE signal while an active CS is provided to the memory device 104A in decision block 404.

If the memory device 104A detects that an active WAKE signal was received (decision block 404, YES branch) then the memory device 104A determines whether there is a Wake ID match in decision block 406. As discussed above, the memory controller 102 can transmit a Wake ID signal via the CA bus 108. In response to determining that an active WAKE signal was received (e.g., by detecting a rising edge on the WAKE bus 106), the memory device 104A compares the Wake ID signal on the CA bus 108 to the Device ID of the memory device 104A. The memory devices 104 each have an associated Device ID, which can be compared to the Wake ID signal to determine if there is a match. For example, the memory device 104A may have a Device ID value of 1. When the memory device 104A receives a Wake signal, as described above with respect to decision block 404, the memory device 104A compares the Device ID of the memory device 104A to the value received via the CA bus 108 (e.g., a Wake ID signal value of 3). The memory device 104A compares the two values to determine if there is a match. If the memory device 104A determines that the Wake ID signal value does not match the Device ID of the memory device 104A (decision block 406, NO branch), then the memory device 104A remains in a low power state until an active WAKE signal and matching Wake ID signal value are received in operation 404.

If the memory device 104A determines that the Wake ID signal value matches the Device ID of the memory device 104A (decision block 406, YES branch), then the memory device 104A exits the low power state in operation 408. Once the memory device 104A exits the low power memory state and enters an active state, the memory device 104A can receive further commands from the memory controller circuit 102 and begin to perform memory operations such as read and write operations. The low power state exit operation, as described above with respect to FIG. 4 does not implicate the CKE bus or interrupt a CKE signal that other memory devices may use (e.g., memory devices 1048-N). Accordingly, the memory devices 1048-N can continue to operate without interruption while the memory device 104A exits a low power state.

Figure 5:
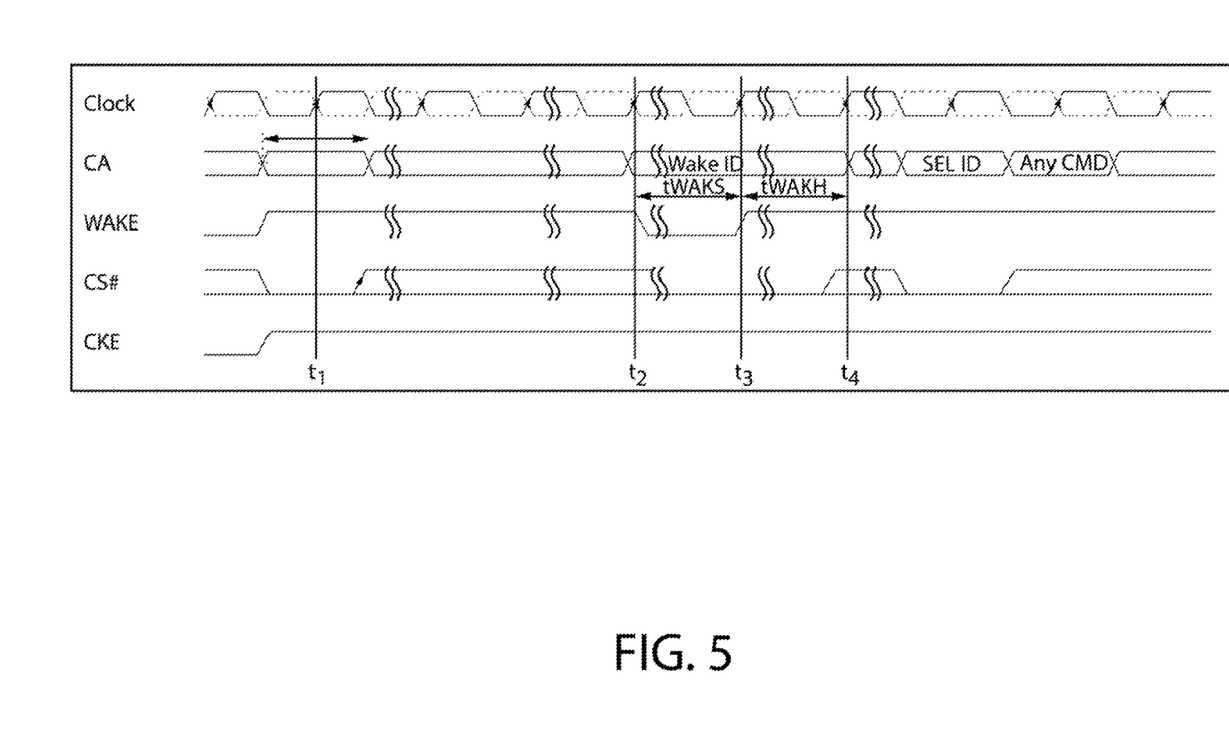
FIG. 5 is a timing diagram illustrating timing of signals received by a memory device, in accordance with the embodiment of FIG. 3.

FIG. 5 is a timing diagram illustrating timing of signals received by the memory device 104A, in accordance with the embodiment of FIG. 4. At time $t_1$, the memory device 104A receives a command via the CA bus 108 to enter a low power state.

Notably, the CS bus 110 has a logic (active) low signal at time $t_1$, which enables the memory device 104A to receive signals provided via the CA bus 108. Upon receipt of the command, the memory device 104A enters a low power state until a low power state exit operation is initiated. At time $t_2$, the memory controller circuit 102 provides a Wake ID signal on the CA bus 108. The memory controller circuit 102 can continue to provide the Wake ID signal until the identified memory device exits its low power state. Between times $t_2$ and $t_3$, the CS bus 110 transitions to a logic low state, enabling the memory device 104A to receive signals provided via the CA bus 108, as well as detect an active (e.g., active high) WAKE signal. At time $t_3$, the WAKE signal provided via the WAKE bus 106 becomes active (e.g., transitions from low to high), prompting the memory device 104A to determine whether its Device ID matches the Wake ID signal provided via the CA bus 108. Between times $t_3$ and $t_4$, the memory device 104A compares its Device ID with the value of Wake ID signal to determine if there is a match. Responsive to determining that the Device ID matches the Wake ID signal value, the memory device 104A exits the low power state. At time $t_4$, the memory device 104A has exited the low power state and entered an active state, allowing it to receive commands to perform memory operations. Notably, the CKE signal remains in a logic high state from $t_1$ through $t_4$, meaning that the CKE signal remains uninterrupted for any memory devices that may be concurrently relying on the CKE signal to control clock signal access.

Figure 6:
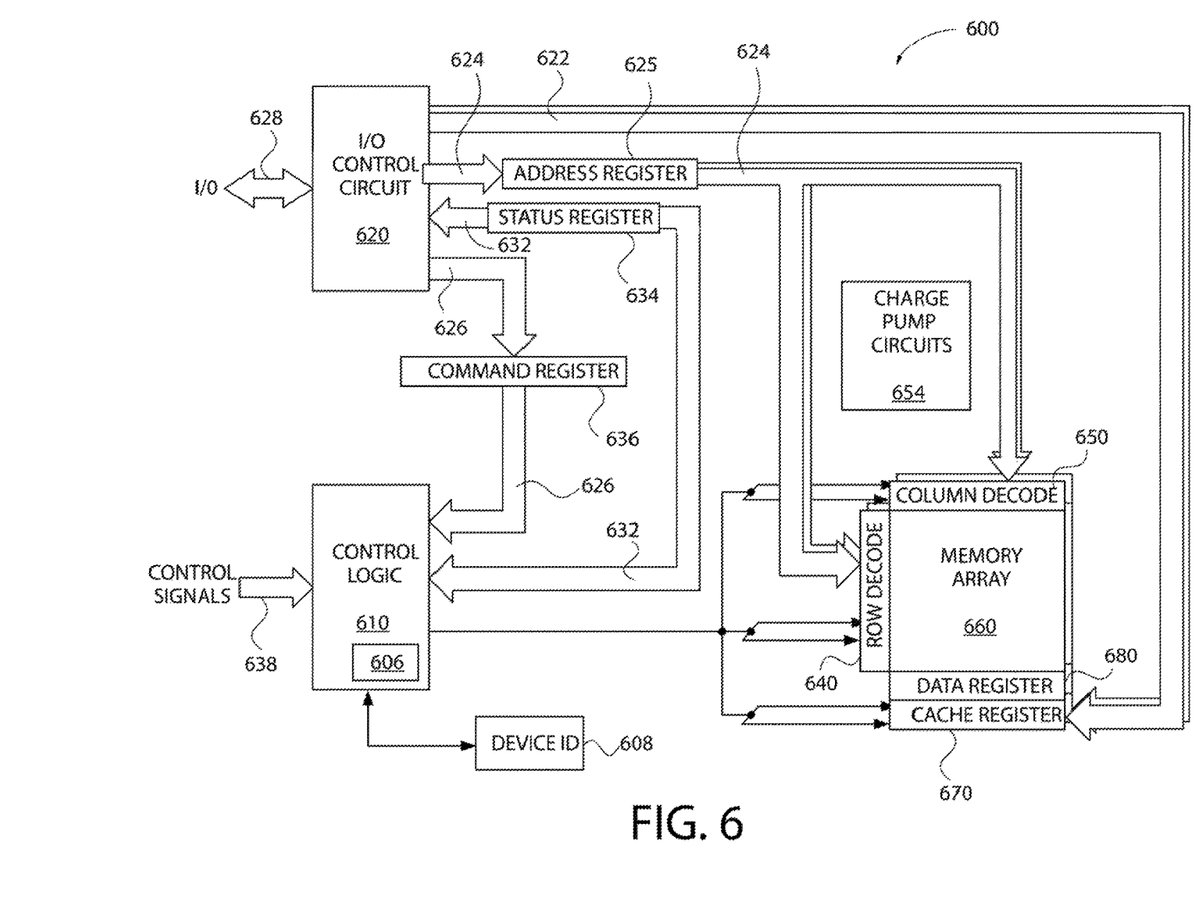
FIG. 6 is a functional block diagram of a memory device, in accordance with an embodiment of the present invention.

FIG. 6 illustrates an apparatus that includes a memory device 600 according to an embodiment of the present invention. The memory device 600 includes a memory array 660 with a plurality of memory cells that are configured to store data. The memory cells may be accessed in the array through the use of various signal lines, word lines (WLs) and/or bit lines (BLs). The memory cells may be non-volatile memory cells, such as NAND or NOR flash cells, phase change memory cells, or may generally be any type of memory cells. The memory cells of the memory array 660 can be arranged in a memory array architecture. For example, in one embodiment, the memory cells are arranged in a 3D cross-point architecture. In other embodiments, other memory array architectures may be used, for example, a single-level cross-point architecture, among others. The memory cells may be single level cells configured to store data for one bit of data. The memory cells may also be multi-level cells configured to store data for more than one bit of data.

A data strobe signal DQS may be transmitted to an I/O control circuit 620 through a data strobe bus (not shown). The DOS signal may be used to provide timing information for the transfer of data to the memory device 600 or from the memory device 600. The I/O bus 628 is connected to the I/O control circuit 620 that routes data signals, address information signals, and other signals between the I/O bus 628 and an internal data bus 622, an internal address bus 624, and/or an internal command bus 626. The I/O bus 628 may include, among others, the CA bus 108. The Wake ID may be provided to the I/O control circuit 620 via the I/O bus 628. The Wake ID may further be provided to the control logic 610 via the internal command bus 626 and the command register 636. An address register 625 may be provided address information by the I/O control circuit 620 to be temporarily stored. The I/O control circuit 620 is coupled to a status register 634 through a status register bus 632. Status bits stored by the status register 634 may be provided by the I/O control circuit 620 responsive to a read status command provided to the memory device 600. The status bits may have respective values to indicate a status condition of various aspects of the memory and its operation.

The memory device 600 also includes a control logic 610 that receives a number of control signals 638 either externally or through the command bus 626 to control the operation of the memory device 600. The control signals 638 may be implemented with any appropriate interface protocol. For example, the control signals 638 may be pin based, as is common in dynamic random access memory and flash memory (e.g., NAND flash), or op-code based. Example control signals 638 include clock signals, read/write signals, clock enable signals, a WAKE signal etc. A command register 636 is coupled to the internal command bus 626 to store information received by the I/O control circuit 620 and provide the information to the control logic 610. The control logic 610 may further access a status register 634 through the status register bus 632, for example, to update the status bits as status conditions change. The control logic 610 may be configured to provide internal control signals to various circuits of the memory device 600. For example, responsive to receiving a memory access command (e.g., read, write), the control logic 610 may provide internal control signals to control various memory access circuits to perform a memory access operation. The various memory access circuits are used during the memory access operation, and may generally include circuits such as row and column decoders, charge pump circuits, signal line drivers, data and cache registers, I/O circuits, as well as others. The control logic 610 may include a low power wake circuit 606. In various embodiments, the low power wake circuit 606 may be implemented in accordance with the low power wake block described above with respect to FIG. 3. The low power wake circuit 606 may be configured to receive a CKE signal and WAKE signal via the control signals 638 and also receive a wake ID via the internal command bus 626. The low power wake circuit 606 may further be configured to access a Device ID circuit 608, in which a device IS for the memory device 600 is stored. The low power wake circuit 606 may compare the Device ID to wake ID and initiate a low power state exit operation responsive to determining that the Device ID matches the wake ID.

The address register 625 provides block-row address signals to a row decoder 640 and column address signals to a column decoder 650. The row decoder 640 and column decoder 650 may be used to select blocks of memory cells for memory operations, for example, read and write operations. The row decoder 640 and/or the column decoder 650 may include one or more signal line drivers configured to provide a biasing signal to one or more of the signal lines in the memory array 660. The signal line drivers may drive the signal lines with a pumped voltage that is provided by charge pump circuits 654. The charge pump circuits 654 may provide different voltages used during operation of the memory device 600, for example, during memory access operations. The voltages provided by the charge pump circuits 654 may include voltages that are greater than a power supply voltage provided to the memory device 600, voltages that are less than a reference voltage (e.g., ground) provided to the memory device 600, as well as other voltages as well.

For a write operation, after the row address signals have been applied to the address bus 624, the I/O control circuit 620 routes write data signals to a cache register 670. The write data signals are stored in the cache register 670 in successive sets each having a size corresponding to the width of the I/O bus 628. The cache register 670 sequentially stores the sets of write data signals for an entire row or page of memory cells in the array 660. All of the stored write data signals are then used to write a row or page of memory cells in the array 660 selected by the block-row address coupled through the address bus 624. In a similar manner, during a read operation, data signals from a row or block of memory cells selected by the block-row address coupled through the address bus 624 are stored in a data register 680. The data register 680 and the cache register 670 may act as a single register for some page operations. For example, data stored in the data register 680 may be also stored in the cache register 670. Sets of data signals corresponding in size to the width of the I/O bus 628 are then sequentially transferred through the I/O control circuit 620 from the data register 680 and/or the cache register 670 to the I/O bus 628.

What is claimed is:

1. An apparatus comprising:
   a memory device having a device identification; and
   a low power wake circuit configured to receive a low power wake signal and an identification information, and further configured to initiate a transition of the memory device from a low power state to an active state responsive to an active low power wake signal and the identification information matching the device identification,
   wherein the memory device matches the identification information and the device information prior to exiting the low power state, and
   wherein the low power wake circuit is further configured to receive the low power wake signal via a wake bus, wherein the wake bus is configured to provide only the low power wake signal.

2. The apparatus of claim 1, wherein the low power wake circuit is further configured to receive the identification information via a command/address bus coupled to the memory device.

3. The apparatus of claim 2, wherein the memory device is further configured to receive a chip select signal, the chip select signal configured to enable the low power wake circuit to receive the identification information via the command/address bus.

4. The apparatus of claim 1, further comprising a circuit configured to store the device identification.

5. A system comprising:
   a plurality of memory devices, each memory device of the plurality of memory devices associated with respective device identification information and configured to have at least one low power state and at least one active state;
   a wake bus coupled to the plurality of memory devices and configured to provide a wake signal to the plurality of memory devices; and
   a command bus coupled the plurality of memory devices and configured to provide wake identification information,
   wherein each memory device of the plurality of memory devices are configured to transition from a low power state to an active state responsive to an active wake signal and the wake identification information matching the respective device identification information, and to remain in the low power state responsive to the active wake signal and the wake identification information not matching the respective device identification information.

6. The system of claim 5, further comprising:
   a memory controller circuit coupled to the wake bus and the command bus and configured to provide the wake signal and the wake identification information.

7. The system of claim 5, further comprising:
   a device identification circuit configured to store the respective device identification information.

8. The system of claim 5, wherein each memory device of the plurality of memory devices comprises a low power wake circuit configured to compare the wake identification information to the respective device identification information.

9. The system of claim 5, further comprising:
   a chip select bus, configured to provide a chip select signal to the plurality of memory devices to enable the one or more memory devices to detect the wake signal and the wake identification information.

10. A memory device interface comprising:
a first bus configured to convey a wake signal for initiating a transition in a memory device from a low power state to an active state; and
a second bus configured to convey a wake identification signal, corresponding to a device identifier of the memory device, and
wherein the wake identification signal is matched to the device identifier of the memory device prior to exiting the low power state.

11. The memory device interface of claim 10, further comprising:
a third bus configured to convey a chip select signal for enabling one or more memory devices to process the wake identifier signal.

12. The memory device interface of claim 11, wherein an active chip select signal is conveyed on the third bus to the memory device when an active wake signal is conveyed to the memory device.

13. The memory device interface of claim 10, further comprising:
a clock enable bus configured to convey a clock enable signal to the memory device, wherein the clock enable signal is uninterrupted by the wake identifier signal and the wake signal conveyed to the memory device.

14. A method comprising:
receiving, by a low power wake circuit, a wake signal configured to initiate a low power state exit operation in a memory device;
receiving, by the low power wake circuit, a signal including wake identification information; and
determining, by the low power wake circuit, whether to initiate a low power state exit operation for an associated memory device based on whether the wake identification information matches a device identifier for the associated memory device when an active wake signal is received by the low power wake circuit.

15. The method of claim 14, further comprising:
responsive to determining that the wake identification information matches the device identifier, initiating a low power state exit operation for the associated memory device.

16. The method of claim 15, further comprising:
responsive to determining that the wake identification information does not match the device identifier, maintaining a low power state for the associated memory device.

17. The method of claim 15, wherein the low power wake circuit receives the wake signal via a dedicated wake bus.

18. The method of claim 15, wherein the wake identifier is received via a command/address bus.

19. The method of claim 15, wherein initiating the low power state exit operation comprises transitioning the associated memory device from a low power state to an active state.

* * * * *